United States Patent
Gardner, III et al.

(10) Patent No.: US 9,648,655 B2
(45) Date of Patent: May 9, 2017

(54) SIMULATION OF NEAR-FIELD COMMUNICATIONS

(71) Applicant: Google Inc., Mountain View, CA (US)

(72) Inventors: Alan Lee Gardner, III, Mountain View, CA (US); Maurice Kyojin Chu, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/348,599

(22) Filed: Nov. 10, 2016

(65) Prior Publication Data

US 2017/0064758 A1    Mar. 2, 2017

Related U.S. Application Data

(63) Continuation of application No. 14/730,808, filed on Jun. 4, 2015, now Pat. No. 9,497,790.

(Continued)

(51) Int. Cl.
*H04B 7/00* (2006.01)
*H04W 76/02* (2009.01)
(Continued)

(52) U.S. Cl.
CPC ....... *H04W 76/023* (2013.01); *H04W 64/006* (2013.01); *H04B 17/318* (2015.01); *H04W 4/008* (2013.01)

(58) Field of Classification Search
CPC . H04W 76/023; H04W 48/16; H04W 64/006; H04W 92/18
(Continued)

(56) References Cited

U.S. PATENT DOCUMENTS

| 8,762,082 B2 * | 6/2014 | Nishida | A63F 13/12 342/28 |
| 2013/0229930 A1 * | 9/2013 | Akay | H04W 52/0245 370/252 |

(Continued)

FOREIGN PATENT DOCUMENTS

WO    2014057465 A1    4/2014

OTHER PUBLICATIONS

International Search Report and Written Opinion of International Application No. PCT/US2016/017514, mailed May 18, 2016, 13 pp.

(Continued)

*Primary Examiner* — April G Gonzales
(74) *Attorney, Agent, or Firm* — Shumaker & Sieffert, P.A.

(57) ABSTRACT

A computing device may identify one or more wireless broadcast signals that are each associated with a name that conforms to a specified wireless naming scheme. Responsive to identifying a particular wireless broadcast signal that is associated with a respective name conforming to the specified wireless naming scheme, the computing device may determine a signal strength of the particular wireless broadcast signal. The computing device may determine a likelihood that a remote device broadcasting the particular wireless signal is within a specified proximity of the computing device based at least in part on the signal strength of the particular wireless broadcast signal. Responsive to determining that the likelihood that the remote device is within the specified proximity of the computing device exceeds a specified threshold, the computing device may initiate an establishment of a wireless connection with the remote device.

20 Claims, 5 Drawing Sheets

Related U.S. Application Data

(60) Provisional application No. 62/127,502, filed on Mar. 3, 2015.

(51) Int. Cl.
*H04W 64/00* (2009.01)
*H04B 17/318* (2015.01)
*H04W 4/00* (2009.01)

(58) Field of Classification Search
USPC ........................................ 455/41.2
See application file for complete search history.

(56) References Cited

U.S. PATENT DOCUMENTS

| | | | | |
|---|---|---|---|---|
| 2014/0030982 A1* | 1/2014 | Cardona | ............... | G01S 5/14 455/67.11 |
| 2014/0133656 A1* | 5/2014 | Wurster | ............... | H04L 9/0637 380/270 |
| 2014/0236365 A1* | 8/2014 | Martin | ............... | G05B 13/02 700/286 |
| 2014/0274031 A1* | 9/2014 | Menendez | ........ | H04W 52/0209 455/426.1 |
| 2014/0370879 A1* | 12/2014 | Redding | ............... | H04W 4/001 455/419 |
| 2016/0262198 A1 | 9/2016 | Gardner, III et al. | | |

OTHER PUBLICATIONS

Liu et al., "Face-to-Face Proximity Estimation Using Bluetooth on Smartphones," IEEE Transactions on Mobile Computing, vol. 13, No. 4, Apr. 2014, pp. 811-823.

Votice of Allowance from U.S. Appl. No. 14/730,808, mailed Jul. 15, 2016 15 pgs.

* cited by examiner

SIMULATION OF NEAR-FIELD COMMUNICATIONS

This application is a continuation of U.S. application Ser. No. 14/730,808, filed Jun. 4, 2015, which claims the benefit of U.S. Provisional Application No. 62/127,502 filed Mar. 3, 2015, the entire content of each of which are hereby incorporated by reference.

BACKGROUND

Near-field communication (NFC) is a technology that enables computing devices, which are physically proximate, to establish a wireless connection in order to share data between the computing devices. For example, two users of NFC-equipped computing devices who would like to share data using the two respective computing devices may physically tap the two computing devices together, or otherwise physically bring the two computing devices extremely close to each other (e.g., within a few inches or centimeters), to establish a wireless connection between the two computing devices. The NFC-equipped computing devices may each detect that the other NFC-equipped computing device is physically proximate, and may establish a peer-to-peer wireless connection with the other NFC-equipped computing device.

SUMMARY

In one aspect, the disclosure is directed to a method. The method includes identifying, by a computing device, one or more wireless broadcast signals that are each associated with a name that conforms to a specified wireless naming scheme. The method further includes responsive to identifying a particular wireless broadcast signal that is associated with a respective name conforming to the specified wireless naming scheme, determining, by the computing device, a signal strength of the particular wireless broadcast signal. The method further includes determining, by the computing device, a likelihood that a remote device broadcasting the particular wireless signal is within a specified proximity of the computing device, wherein determining the likelihood that the remote device is within the specified proximity of the computing device is based at least in part on (1) a type of the computing device, (2) a type of the remote device broadcasting the particular wireless broadcast signal, and (3) the signal strength of the particular wireless broadcast signal. The method further includes responsive to determining that the likelihood that the remote device is within the specified proximity of the computing device exceeds a specified threshold, initiating, by the computing device, an establishment of a wireless connection with the remote device.

In another aspect, the disclosure is directed to a computing device. The computing device may include at least one processor. The computing device may further include at least one module operable by the at least one processor to: identify one or more wireless broadcast signals that are each associated with a name that conforms to a specified wireless naming scheme; responsive to identifying a particular wireless broadcast signal that is associated with a respective name conforming to the specified wireless naming scheme, determine a signal strength of the particular wireless broadcast signal; determine a likelihood that a remote device broadcasting the particular wireless signal is within a specified proximity of the computing device, wherein determining the likelihood that the remote device is within the specified proximity of the computing device is based at least in part on (1) a type of the computing device, (2) a type of the remote device broadcasting the particular wireless broadcast signal, and (3) the signal strength of the particular wireless broadcast signal; and responsive to determining that the likelihood that the remote device is within the specified proximity of the computing device exceeds a specified threshold, initiating an establishment of a wireless connection with the remote device.

In another aspect, the disclosure is directed to a computer-readable storage medium encoded with instructions that, when executed, cause at least one processor of a computing device to: identify one or more wireless broadcast signals that are each associated with a name that conforms to a specified wireless naming scheme; responsive to identifying a particular wireless broadcast signal that is associated with a respective name conforming to the specified wireless naming scheme, determine a signal strength of the particular wireless broadcast signal; determine a likelihood that a remote device broadcasting the particular wireless signal is within a specified proximity of the computing device, wherein determining the likelihood that the remote device is within the specified proximity of the computing device is based at least in part on (1) a type of the computing device, (2) a type of the remote device broadcasting the particular wireless broadcast signal, and (3) the signal strength of the particular wireless broadcast signal; and responsive to determining that the likelihood that the remote device is within the specified proximity of the computing device exceeds a specified threshold, initiate establishment of a wireless connection with the remote device.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
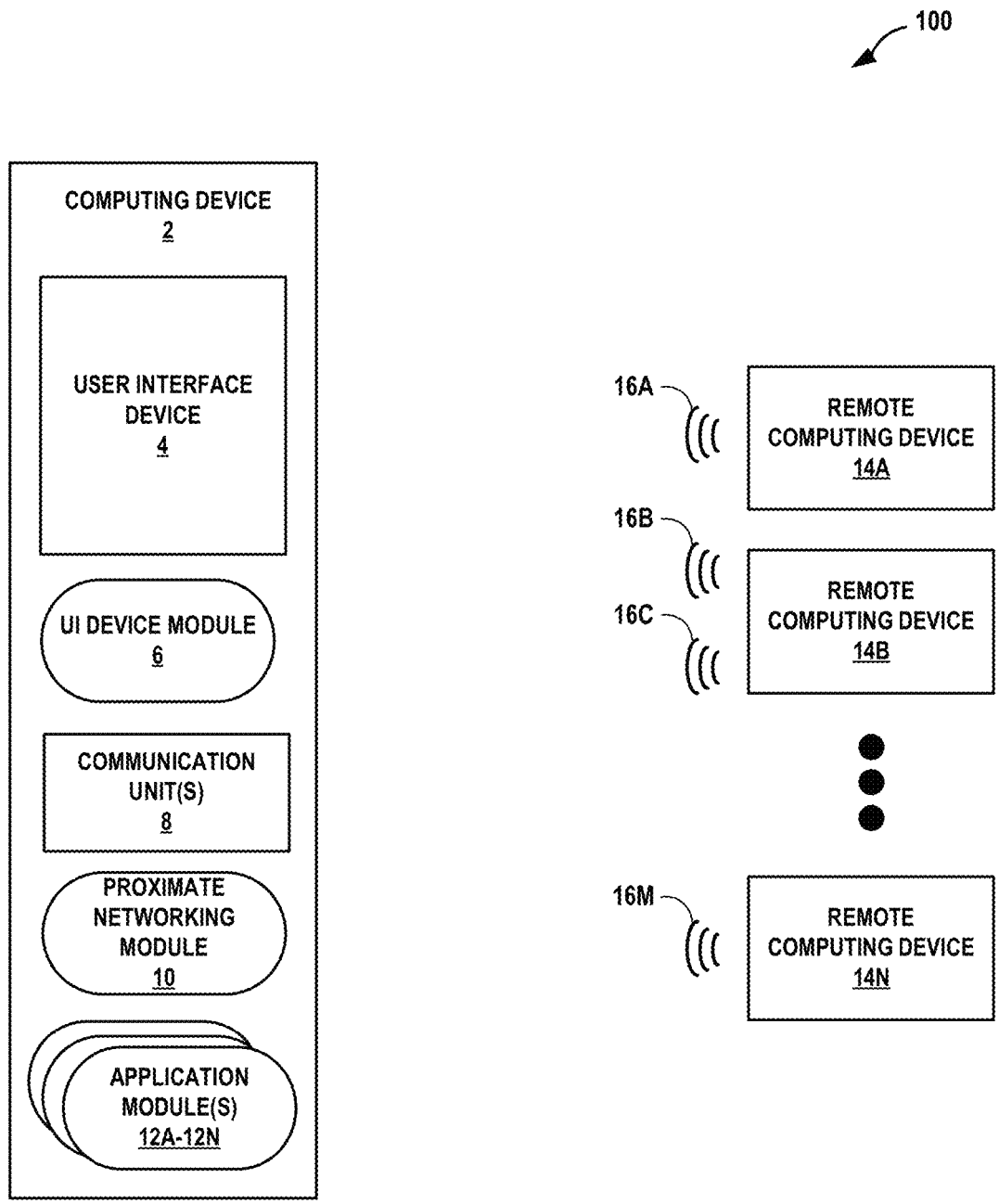
FIG. 1 is a block diagram illustrating an example system that may be configured to simulate near-field communications, in accordance with one or more techniques of the present disclosure.

In general, aspects of the present disclosure are directed to techniques for a computing device to determine whether a remote computing device is within a specified proximity of the computing device and, if so, to establish a wireless connection with the remote computing device to transfer data between the computing device and the remote computing device. In some examples, a computing device equipped with Near-field Communication (NFC) can utilize NFC technology to detect other NFC-equipped computing devices that are within a specified proximity of the computing device and to establish a wireless connection with proximate NFC-equipped computing devices.

However, not all computing devices are equipped with NFC hardware. Furthermore, computing devices equipped with NFC hardware may, at any given time, have NFC functionality turned off (e.g., have its NFC chip turned off). In these cases, a computing device may still be able to determine whether a remote computing device is within a specified proximity of the computing device and, if so, establish a wireless connection with the remote computing device without the use of NFC. The computing device may be able to make such a determination based at least in part on an observed signal strength of a wireless broadcast signal that is broadcast by the remote computing device. However, the signal strength of the wireless broadcast signal being broadcast by the remote computing device and observed by the computing device alone may not, in all cases, be enough to determine how close the remote computing device is physically to the computing device.

For example, due to differences in material of external enclosures (e.g., aluminum vs. plastic), differences in the types and brands of wireless networking hardware, differences in the placement and performance of antennas, and the like, different types, models, and/or brands of computing devices may perform differently when outputting wireless broadcast signals. Similarly, different types, models, and/or brands of computing devices may also perform differently when receiving wireless broadcast signals. Therefore, determining whether a remote computing device is within a specified proximity of the computing device may be based not just on the signal strength of the wireless broadcast signal, but also on the device type of the computing device that receives the wireless broadcast signal, and also possibly on the device type of the remote computing device that broadcasts the wireless broadcast signal.

In accordance with techniques of the disclosure, the computing device may scan for one or more wireless broadcast signals that are each associated with a name that conforms to a specified wireless naming scheme. The computing device may, responsive to identifying a particular wireless broadcast signal having a respective associated name that conforms to the specified wireless naming scheme, determine a signal strength of the particular wireless broadcast signal. The computing device may determine a likelihood that a remote device broadcasting the particular wireless signal is within a specified proximity (e.g., within a few inches or centimeters) of the computing device, wherein determining the likelihood that the remote device is within the specified proximity of the computing device is based at least in part on (1) a type of the computing device, (2) a type of the remote device broadcasting the particular wireless broadcast signal, and (3) the signal strength of the particular wireless broadcast signal. The computing device may, responsive to determining that the likelihood that the remote device is within the specified proximity of the computing device exceeds a specified threshold, establish a wireless connection with the remote device.

The techniques disclosed herein may potentially lower the costs of computing devices that use the techniques disclosed herein given that the computing devices may no longer necessarily include NFC hardware. The techniques disclosed herein may also potentially enable computing devices that lack NFC hardware to detect other computing devices that are within a specified physical proximity without the use of NFC hardware and/or without using a third-party server device, and to form a peer-to-peer wireless connection to transfer data between such computing devices.

FIG. 1 is a block diagram illustrating an example system for simulating near-field communications in accordance with one or more techniques of the present disclosure. As shown in FIG. 1, system 100 may include computing device 2 and one or more remote computing devices 14A-14N ("one or more remote computing devices 14").

In some examples, computing device 2 may include, but is not limited to, portable or mobile devices such as mobile phones (including smart phones), laptop computers, tablet computers, wearable computing devices such as smart watches or computerized eyewear, smart television platforms, cameras, personal digital assistants (PDAs), etc. In some examples, computing device 2 may include stationary computing devices such as desktop computers, servers, mainframes, etc. Computing device 2, in some examples, may include user interface (UI) device 4, UI device module 6, one or more communication units 8, and proximity networking module 10, and application modules 12A-12N. Other examples of computing device 2 that implement techniques of this disclosure may include additional components not shown in FIG. 1.

UI device module 6 may cause UI device 4 to output a user interface for display and, as a user of computing device 2 interacts with the user interface presented at UI device 4, UI device module 6 may interpret inputs detected at UI device 4 (e.g., as a user provides one or more gestures at a location of UI device 4 at which user interface 16 or another example user interface is displayed). UI device module 6 may relay information about the inputs detected at UI device 4 to one or more associated platforms, operating systems, applications, and/or services executing at computing device 2 to cause computing device 2 to perform a function.

UI device module 6 may also receive information and instructions from one or more associated platforms, operating systems, applications, and/or services executing at computing device 2 for generating a user interface. In addition, UI device module 6 may act as an intermediary between the one or more associated platforms, operating systems, applications, and/or services executing at computing device 2 and various output devices of computing device 2 (e.g., speakers, LED indicators, vibrators, etc.) to produce output (e.g., graphical, audible, tactile, etc.) with computing device 2. In the example of FIG. 1, UI device 4 may be a presence-sensitive display that may display a graphical user interface and receive input using capacitive, inductive, and/or optical detection at or near the presence-sensitive display.

UI device module 6 may be implemented in various ways. For example, UI device module 6 may be implemented as a downloadable or pre-installed application or "app." In another example, UI device module 6 may be implemented as part of a hardware unit of computing device 2. In another example, UI device module 6 may be implemented as part of an operating system of computing device 2. In some instances, portions of the functionality of UI device module 6 or any other module described in this disclosure may be implemented across any combination of an application, hardware unit, and operating system.

One or more communication units 8 of computing device 2 may communicate with external devices via one or more networks by transmitting and/or receiving network signals on the one or more networks. For example, computing device 2 may use communication units 8 to send and receive data to and from one or more remote computing devices 14. Computing device 2 may use communication units 8 to, e.g., transmit and/or receive radio signals on a radio network such as a cellular radio network. Likewise, communication units 8 may transmit and/or receive satellite signals on a satellite network such as a global positioning system (GPS) network. Examples of communication units 8 include network interface cards (e.g. such as an Ethernet card), optical transceivers, radio frequency transceivers, GPS receivers, wireless networking modules that support the Institute of Electrical and Electronics Engineers (IEEE) 802.11 (WiFi) wireless communication protocol, Bluetooth modules that can send and receive Bluetooth and/or Bluetooth low energy (LE) signals, or any other types of devices that can send and/or receive information via either wired or wireless networks, including peer-to-peer network communications. Other examples of communication units 8 may include short wave radios, cellular data radios, wireless Ethernet network radios, as well as universal serial bus (USB) controllers, and NFC hardware. In some examples, one or more communication units 8 do not include any NFC hardware. In some other examples, one or more communication units 8 may include NFC hardware, but such NFC hardware may be powered off or is otherwise not in use.

In accordance with aspects of the present disclosure, computing device 2 may scan for one or more wireless broadcast signals that are each associated with a name that conforms to a specified wireless naming scheme. Specifically, proximate networking module 10 may cause one or more communication units 8 to scan for and identify one or more wireless broadcast signals that are each associated with a name conforming to a specified wireless naming scheme. In one example, one or more communication units 8 may scan for WiFi signals being broadcast by WiFi access points or computing devices acting as hotspots having service set identifiers (SSIDs) that conform to a specified wireless naming scheme. In another example, one or more communication units 8 may scan for Bluetooth or Bluetooth LE signals advertising Bluetooth discoverable devices having names that conform to a specified wireless naming scheme. In some examples, one or more communication units 8 may scan for different types of signals (e.g., WiFi signals, Bluetooth signals, and/or Bluetooth LE signals) at the same time.

In some examples, to conform with the specified naming scheme, wireless broadcast signals may include or otherwise be associated with names that each include a specific identifier that identifies the associated broadcast wireless signal as being broadcast by a computing device that simulates near-field communications according to the techniques disclosed herein. The specified naming scheme may be any suitable naming scheme that is established for computing device 2 as well as any devices that broadcast the one or more wireless broadcast signals that identify the devices as implementing the techniques disclosed herein with respect to simulation of near-field communications.

In one example, the specified naming scheme may include a prefix followed by an identifier, denoted as <prefix>+<id> or an identifier followed by a suffix, denoted as <id>+<suffix>. The prefix <prefix> or suffix <suffix) may include any suitable combination of letters, numbers, symbols, and the like that identifies the associated device as a device that participates in and/or supports the techniques disclosed herein to simulate near-field communications. The identifier <id> may include any suitable combination of letters, numbers, symbols, and the like that provides identifying information about the associated device. For example, the identifier <id> may include a name of the associated device. The specified naming scheme may further include, in some examples, a small encoded device type identifier, which can be used by computing device 2 to lookup further details about the broadcasting device in an existing local or remote database. For example, the small encoded device type identifier may be a 2 byte suffix, which may map to up to $2^{16}$ different devices.

In another example, the specified naming scheme may include an encrypted string of a defined format. Such a naming scheme may be used if computing device 2 as well as any devices that broadcast the one or more wireless broadcast signals already share the same private key. In this example, the naming scheme <prefix>+<id> or <id>+<suffix>, as described above, may be encrypted using any suitable cryptography technique, such as public-key cryptography, partial or full digital signatures, one-way hash of shared secrets, and the like. For example, the naming scheme <prefix>+<id> or <id>+<suffix> may be encrypted using the public key that corresponds to the shared private key to result in an encrypted naming scheme for each broadcasting device. Computing device 2 may decrypt each of the encrypted naming schemes using the corresponding private key. In this way, the encrypted naming scheme may prevent spoofing of wireless broadcast signals which may correspond to the naming scheme for which computing device 2 is scanning.

In one example, proximate networking module 10 may cause one or more communication units 8 to scan for the one or more wireless broadcast signals at regular intervals (e.g., every 10 seconds, every 30 seconds, and the like). As such, in this example, one or more communication units 8 may perform the scan in a periodic fashion. In another example, proximate networking module 10 may cause one or more communication units 8 to scan for the one or more wireless broadcast signals when one or more communication units 8 performs scans for other wireless broadcast signals of the same type, such that one or more communication units 8 may piggyback onto scans for other wireless broadcast signals. For example, if the one or more wireless broadcast signals are WiFi signals, one or more communication units 8 may piggyback the scanning for the one or more wireless broadcast signals onto other WiFi scans performed by one or more communication units 8, such as WiFi scans that are regularly performed by one or more communication units 8 to determine the physical location of computing device 2 or to determine a list of WiFi access points. In this way, if one or more communication units 8 performs a WiFi scan unrelated to the scanning for the one or more wireless broadcast signals, one or more communication units 8 may, subsequent (or prior) to performing the WiFi scan, also scan for the one or more wireless broadcast signals utilizing the same WiFi radio included in one or more communication units 8. In this way, proximate networking module 10 may enable computing device 2 to conserve power and/or battery life by scanning for the one or more wireless broadcast signals when the associated wireless module (e.g., WiFi module) is powered on to scan for other wireless signals.

In some examples, in order to further conserve power, one or more communication units 8 may not scan for one or more wireless broadcast signals when user interface device 4 is powered off, such that, in these examples one or more communication units 8 may scan for one or more wireless broadcast signals only when user interface device 4 is powered on. For example, if user interface device 4 is a display that is operably coupled to computing device 2, one or more communication units 8 may not scan for one or more wireless broadcast signals when the display is turned off, and may start scanning for the one or more wireless broadcast signals upon the display turning on. Upon the display being turned off, one or more communication units 8 may cease scanning for the one or more wireless broadcast signals. In some other examples, in order to conserve power and/or battery life, one or more communication units 8 do not scan for Bluetooth signals until one or more communication units 8 has found a WiFi signal that conforms to the specified naming scheme.

One or more remote computing devices 14 may include, but are not limited to, portable or mobile devices such as mobile phones (including smart phones), laptop computers, tablet computers, wearable computing devices such as smart watches or computerized eyewear, smart television platforms, cameras, personal digital assistants (PDAs), etc. In some examples, one or more remote computing devices 14 may include stationary computing devices such as desktop computers, servers, mainframes, etc. One or more remote computing devices 14 may broadcast one or more wireless broadcast signals 16A-16M ("one or more wireless broadcast signals 16").

For example, each of one or more remote computing devices may broadcast one or more respective wireless broadcast signals of broadcast signals 16. Each of these one or more wireless broadcast signals may be a WiFi signal, a Bluetooth signal, a Bluetooth LE signal, and the like. If a wireless broadcast signal of one or more wireless broadcast signals 16 is a WiFi signal, the wireless broadcast signal may be a WiFi signal that advertises a WiFi access point having an associated SSID. If a wireless broadcast signal of one or more wireless broadcast signals 16 is a Bluetooth signal or a Bluetooth LE signal, the wireless broadcast signal may be a Bluetooth signal or a Bluetooth LE signal that advertises a Bluetooth discoverable device having an associated Bluetooth device name.

In some examples, a remote computing device of one or more remote computing devices may broadcast more than one wireless broadcast signal. For example, a remote computing device may broadcast both a WiFi signal that advertises a WiFi access point having an associated SSID and a Bluetooth signal that advertises the remote computing device as a Bluetooth discoverable device having an associated Bluetooth device name. In the example of FIG. 1, remote computing device 14A may broadcast a single wireless broadcast signal 16A, such as a WiFi signal that advertises a WiFi access point having an associated SSID that fits the naming scheme specified by computing device 2, while remote computing device 14B may broadcast two wireless broadcast signals: wireless broadcast signal 16B, such as a WiFi signal that advertises a WiFi access point having an associated SSID that fits the naming scheme specified by computing device 2, and wireless broadcast signal 16C, such as a Bluetooth signal that advertises a Bluetooth discoverable device having an associated device name that fits the naming scheme specified by computing device 2.

Computing device 2 may identify one or more wireless broadcast signals each being associated with a respective name that conforms to the specified naming scheme. Each of the one or more wireless signals may be transmitted from the same or different remote computing devices. For example, computing device 2 may identify wireless broadcast signals 16A, 16B, and 16C transmitted by remote computing devices 14A and 14B as each being associated a respective name that conforms to the specified naming scheme. Responsive to identifying a particular wireless broadcast signal having an associated respective name that conforms to the specified wireless naming scheme, computing device 2 may determine a signal strength of the particular wireless broadcast signal. In some cases, determining a signal strength of the particular wireless broadcast signal may include one or more communication units 8 measuring a received signal strength indicator (RSSI) for the particular wireless signal, which is a measurement of the power present in a received radio signal. The higher the RSSI for the particular wireless signal measured by one or more communication units 8, the stronger the signal may appear to one or more communication units 8. For example, if computing device 2 identifies wireless broadcast signals 16A, 16B, and 16C as each having a respective name that conforms to the specified naming scheme, computing device 2 may determine a signal strength for each of wireless broadcast signals 16A, 16B, and 16C, such as by determining the RSSI for each of wireless broadcast signals 16A, 16B, and 16C.

Responsive to identifying the particular wireless broadcast signal having the respective name that conforms to the specified wireless naming scheme, computing device 2 may also increase its scanning frequency to establish a regularly updated signal strength for the particular wireless broadcast signal having the respective name that conforms to the specified wireless naming scheme. For example, if computing device 2 periodically scans for wireless broadcast signals every 30 seconds before computing device 2 identifies a particular wireless broadcast signal having a respective name that conforms to the specified wireless naming scheme, computing device 2 may, responsive to identifying a particular wireless broadcast signal having a respective name that conforms to the specified wireless naming scheme, increase its scanning frequency from every 30 seconds to, for example, every 10 seconds, in order to more frequently update its determination of the signal strength for the particular wireless signal. Each time computing device 2 scans one or more wireless broadcast signals that are each associated with a name that conforms to a specified wireless naming scheme, computing device 2 may receive the one or more wireless broadcast signals that are each associated with a name that conforms to a specified wireless naming scheme, and computing device 2 may be able to determine the signal strengths of the one or more wireless broadcast signals. In this way, computing device 2 may determine regularly updated signal strengths for the one or more wireless broadcast signals.

In the example of FIG. 1, proximate networking module 10 of computing device 2 may identify wireless broadcast signals 16A, 16B, and 16C, which may respectively be a WiFi signal, a WiFi signal, and a Bluetooth signal, as each having associated respective names that conform to the specified naming scheme. Responsive to identifying wireless broadcast signals 16A, 16B, and 16C as each having respective names that conform to the specified naming scheme, proximate networking module 10 may cause one or more communication units 8 to increase its scanning frequency for one or more wireless broadcast signals that are each associated with a name that conforms to a specified wireless naming scheme to establish regularly updated signal strengths for each of wireless broadcast signals 16A, 16B, and 16C.

Computing device 2 may determine whether the remote computing device of one or more remote computing devices 14 is within the specified proximity of computing device 2 by determining the likelihood that the remote computing device of one or more remote computing devices 14 is within the specified proximity of computing device 2. Computing device 2 may determine such likelihood based at least in part on (1) a type of computing device 2, (2) a type of the remote computing device of one or more remote computing devices 14 broadcasting the particular wireless broadcast signal, and (3) the signal strength of the particular wireless broadcast signal. In some examples being within the specified proximity may include being within a few centimeters or inches, such as being within ten centimeters, being within four inches, and the like. Specifically, computing device 2 may normalize the signal strength of the particular wireless broadcast signal based at least in part on the device type of the broadcasting computing device (e.g., the remote computing device) and the device type of the receiving computing device (e.g., computing device 2). Computing device 2 may compare the normalized signal strength against a threshold value, such as a threshold signal strength, to determine the likelihood that the remote computing device of one or more remote computing devices 14 is within the specified proximity of computing device 2. Computing device 2 may, in some examples, determine the likelihood that the remote computing device is within the specified proximity of computing device 2 as expressed by the following identify function:

$$\text{Nearby}(d1,d2,\text{rssi,confidence}) = \text{Threshold}(f(d1,\text{rssi}) + g(d2,\text{rssi}),\text{confidence}) \quad (1)$$

where "Nearby( )" is an indicator function of whether remote computing device is within the specified proximity of computing device 2, "Threshold( )" is an indicator function of whether or not the normalized signal strength of the wireless broadcast signal exceeds the threshold for the broadcasting remote computing device to be considered within the specified proximity of computing device 2, "d1" is the device type of computing device 2, "d2" is the device type of the remote computing device that broadcasts the wireless broadcast signal, "rssi" is the observed signal strength over time of the wireless broadcast signal, "f( )" and "g( )" are normalizing functions to determine the confidence that the remote computing device is within a specified proximity of computing device 2, and "confidence" is the likelihood that the remote computing is within the specified proximity of computing device 2.

As such, according to identity function (1), whether a computing device of device type d1 is considered to be nearby a computing device of device type d2 (e.g., within a specified proximity of each other) given a signal strength of a signal wirelessly broadcast by the computing device of device type d2 and received by the computing device of device type d1 may be equal to whether the normalized signal strength of the signal wirelessly broadcast by the computing device of device type d2 and received by the computing device of device type d1 exceeds a threshold. Thus, in the example shown in FIG. 1, determining the likelihood that the remote computing device of one or more remote computing devices 14 is within the specified proximity of computing device 2 includes normalizing the signal strength of the particular wireless broadcast signal that is broadcast by the remote computing device and is received by computing device 2. If computing device 2 determines that the normalized signal strength exceeds a threshold signal strength, computing device 2 may determine that the likelihood that the remote computing device is within the specified proximity of computing device 2 exceeds a specified threshold.

In the example of FIG. 1, based on the type of computing device 2, the type of the remote computing device 14A broadcasting wireless broadcast signal 16A, which is a WiFi signal, and the signal strength of wireless broadcast signal 16A, computing device 2 may determine the likelihood that the remote computing device 14A is within the specified proximity of computing device 2 based on the following identify function:

$$\text{Nearby}(d1,d2,\text{rssi\_wifi,confidence}) = \text{Threshold}(fw(d1,\text{rssi\_wifi}) + gw(d2,\text{rssi\_wifi}),\text{confidence}) \quad (2)$$

where Nearby( ) is an indicator function of whether remote computing device 14A is within the specified proximity of computing device 2, Threshold( ) is an indicator function of whether or not the normalized signal strength of wireless broadcast signal 16A exceeds the threshold for remote computing device 14A to be considered within the specified proximity of computing device 2, d1 is the device type of computing device 2, d2 is the device type of remote computing device 14A, rssi_wifi is the observed signal strength over time of wireless broadcast signal 16A, fw( ) and gw( ) are normalizing functions to determine the confidence that remote computing device 14A is within a specified proximity of computing device 2, and confidence is the likelihood that remote computing device 14A is within the specified proximity of computing device 2.

Likewise, based on the type of computing device 2, the type of the remote computing device 14B broadcasting both wireless broadcast signal 16B, which is a WiFi signal, and wireless broadcast signal 16C, which is a Bluetooth signal, and the signal strengths of wireless broadcast signals 16B and 16C, computing device 2 may determine the likelihood that the remote computing device 14B is within the specified proximity of computing device 2 based on the following identify function:

$$\text{Nearby}(d1,d2,\text{rssi\_wifi,rssi\_bluetooth,confidence}) = \text{Threshold}(fw(d1,\text{rssi\_wifi}) + fb(d1,\text{rssi\_bluetooth}) + gw(d2,\text{rssi\_wifi}) + gb(d2,\text{rssi\_bluetooth}),\text{confidence}), \quad (3)$$

where Nearby( ) is an indicator function of whether remote computing device 14B is within the specified proximity of computing device 2, Threshold( ) is an indicator function of whether or not the normalized signal strength of wireless broadcast signals 16B and 16C exceeds the threshold for remote computing device 14B to be considered within the specified proximity of computing device 2, d1 is the device type of computing device 2, d2 is the device type of remote computing device 14B, rssi_wifi is the observed signal strength over time of wireless broadcast signal 16B, rssi_bluetooth is the observed signal strength over time of wireless broadcast signal 16C, fw( ), fb( ), gw( ), and gb( ) are normalizing functions to determine the confidence that remote computing device 14B is within a specified proximity of computing device 2, and confidence is the likelihood that remote computing device 14B is within the specified proximity of computing device 2.

In some examples, equation (3) may be rewritten as the following:

$$\text{Nearby}(d1,d2,\text{rssi\_wifi,rssi\_bluetooth,confidence}) = \text{Threshold}(fw(d1,d2,\text{rssi\_wifi}) + fb(d1,d2,\text{rssi\_bluetooth}),\text{confidence}), \quad (4)$$

where normalizing functions fw( ) and fb( ) are functions of d1 and d2.

As such, computing device 2 may determine the likelihood that the remote computing device of one or more remote computing devices 14 is within the specified proximity of computing device 2 by normalizing the signal strength of the particular wireless broadcast signal (e.g., by performing normalizing functions fw( ), fb( ), gw( ), and gb( ), such that computing device 2 may determine the likelihood that the remote computing device of one or more remote computing devices 14 is within the specified proximity of computing device 2 based at least in part on the normalized signal strength of the particular wireless broadcast signal. The normalized signal strength is compared to a threshold signal strength, and if the normalized signal strength exceeds the threshold signal strength, computing device 2 may deem the likelihood of the remote computing device is within the specified proximity of computing device 2 to exceed a specified threshold. Details of example techniques for normalizing signal strength are discussed below with respect to FIGS. 4A-4B.

Responsive to determining that the likelihood that the remote computing device of one or more remote computing devices 14 is within the specified proximity of computing device 2 exceeds a specified threshold, computing device 2 may establish a wireless connection with the remote device. In other words, upon determining that the remote computing device is likely to be physically close (e.g., within 3-4 inches) to computing device 2, computing device 2 may establish a wireless connection with the remote computing device to exchange data between computing device 2 and the remote computing device.

In the example of FIG. 1, proximate networking module 10 may determine that the likelihood that remote computing device 14A is within the specified proximity (e.g., within 3-4 inches) of computing device 2 does not exceed the specified threshold, and may further determine that the likelihood that remote computing device 14B is within the specified proximity of computing device 2 does exceed the specified threshold. Responsive to proximate networking module 10 determining that the likelihood of remote computing device 14B broadcasting wireless broadcast signals 16B and 16C exceeds the specified threshold, proximate networking module 10 may utilize one or more communication units 8 to initiate an establishment of a wireless connection with remote computing device 14B.

For example, if wireless broadcast signal 16B is a WiFi broadcast signal, computing device 2 may communicate via WiFi with remote computing device 14A to establish a WiFi connection, so that data can be transferred between computing device 2 and remote computing device 14B via WiFi. Alternatively, wireless broadcast signal 16B is a Bluetooth broadcast signal, computing device 2 may communicate via Bluetooth with remote computing device 14B to establish a Bluetooth or Bluetooth LE connection, so that data can be transferred between computing device 2 and remote computing device 14B via Bluetooth or Bluetooth LE. In some examples, if remote computing device 14B does not broadcast a Bluetooth or Bluetooth LE wireless broadcast signal 16C, but otherwise supports Bluetooth or Bluetooth LE wireless connections, computing device 2 may communicate via WiFi with remote computing device 14B to establish a Bluetooth or Bluetooth LE connection between computing device 2 and remote computing device 14B, so that data can be transferred between computing device 2 and remote computing device 14B via Bluetooth or Bluetooth LE.

Computing device 2 and remote computing device 14B may also perform one or more security protocols to verify the identity of each other. Examples of such security protocols may include certificate chains, zero knowledge proofs, shared secrets, and the like. In some examples, the computing device that is transferring data to the other device may also attempt to verify the signal strength of the other device or attempt to determine that the other device is within the specified proximity. For example, computing device 2 and remote computing device 14B may exchange accelerometer data to determine if computing device 2 and remote computing device 14B have physically contacted each other.

Proximate networking module 10 may be implemented in various ways. For example, proximate networking module 10 may be implemented as a downloadable or pre-installed application or "app." In another example, proximate networking module 10 may be implemented as part of a hardware unit of computing device 2. In another example, proximate networking module 10 may be implemented as part of an operating system of computing device 2. In some instances, portions of the functionality of proximate networking module 10 or any other module described in this disclosure may be implemented across any combination of an application, hardware unit, and operating system.

Figure 2:
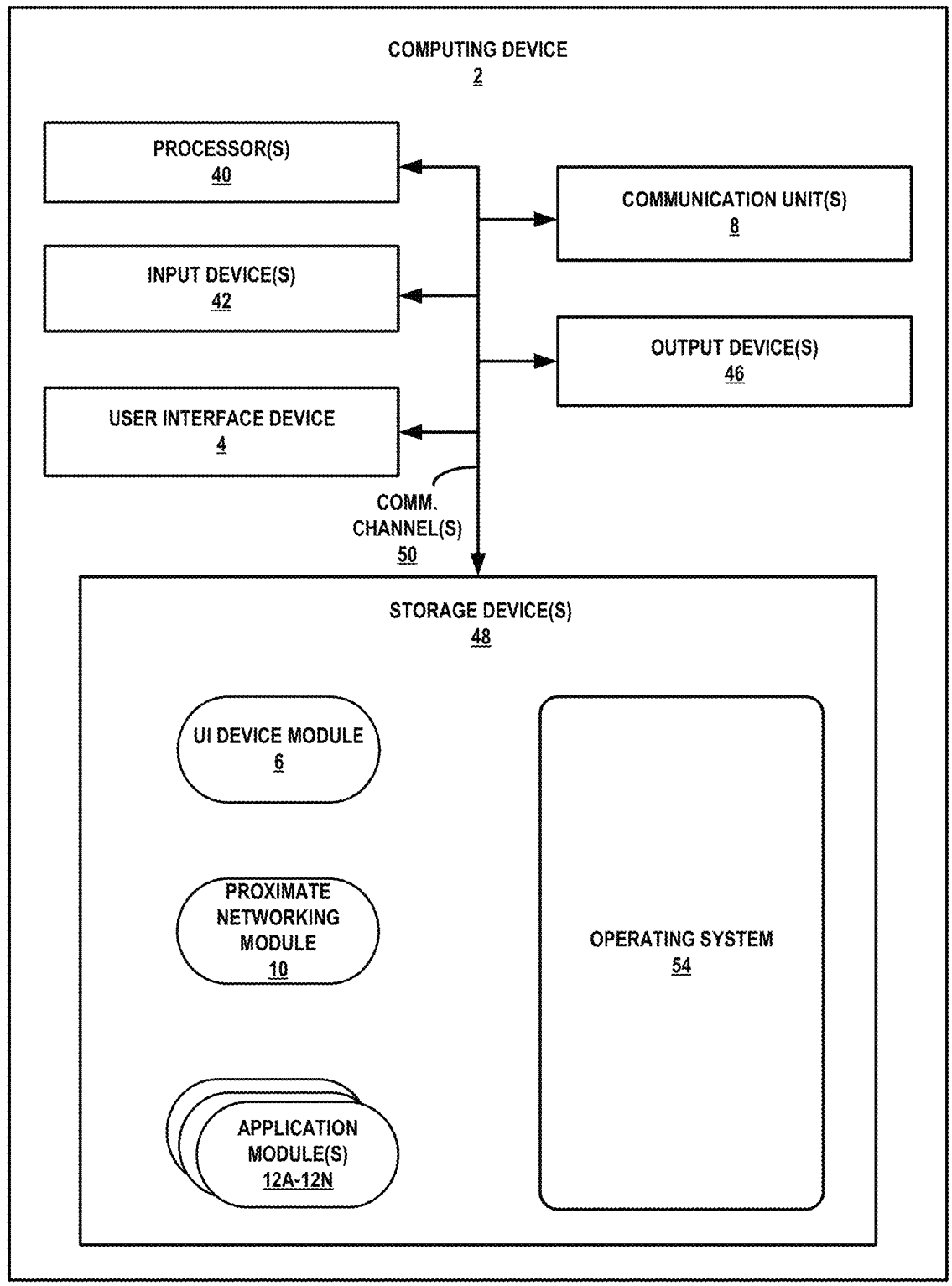
FIG. 2 is a block diagram illustrating an example computing device in accordance with one or more techniques of the present disclosure.

FIG. 2 is a block diagram illustrating an example computing device configured to X in accordance with one or more techniques of the present disclosure. Computing device 2 of FIG. 2 is described below within the context of computing device 2 of FIG. 1. FIG. 2 illustrates only one particular example of computing device 2 of system 100, and many other examples of computing device 2 may be used in other instances and may include a subset of the components included in example computing device 2 or may include additional components not shown in FIG. 2.

As shown in the example of FIG. 2, computing device 2 includes user interface device 4 ("UID 4"), one or more processors 40, one or more input devices 42, one or more communication units 8, one or more output devices 46, and one or more storage devices 48. Storage devices 48 of computing device 2 also include UI device module 6, proximate networking module 10, application modules 12A-12N ("application modules 12"), and operating system 54. Communication channels 50 may interconnect each of the components 4, 6, 8, 10, 12, 40, 42, 46, 48, and 54 for inter-component communications (physically, communicatively, and/or operatively). In some examples, communication channels 50 may include a system bus, a network connection, an inter-process communication data structure, or any other method for communicating data.

One or more input devices 42 of computing device 2 may receive input. Examples of input are tactile, audio, and video input. Input devices 42 of computing device 2, in one example, includes a presence-sensitive display, touch-sensitive screen, mouse, keyboard, voice responsive system, video camera, microphone or any other type of device for detecting input from a human or machine.

One or more output devices 46 of computing device 2 may generate output. Examples of output are tactile, audio, and video output. Output devices 46 of computing device 2, in one example, includes a presence-sensitive display, sound card, video graphics adapter card, speaker, cathode ray tube (CRT) monitor, liquid crystal display (LCD), or any other type of device for generating output to a human or machine.

One or more communication units 8 of computing device 2 may communicate with external devices via one or more networks by transmitting and/or receiving network signals on the one or more networks. For example, computing device 2 may use communication unit 8 to send and receive data to and from information server system 60 of FIG. 1. Computing device 2 may use communication unit 8 to transmit and/or receive radio signals on a radio network such as a cellular radio network. Likewise, communication units 8 may transmit and/or receive satellite signals on a satellite network such as a global positioning system (GPS) network. Examples of communication unit 8 include a network interface card (e.g. an Ethernet card), an optical transceiver, a radio frequency transceiver, a GPS receiver, or any other type of device that can send and/or receive information. Other examples of communication units 8 may include short wave radios, cellular data radios, wireless Ethernet network radios, as well as universal serial bus (USB) controllers.

In some examples, UID 4 of computing device 2 may include functionality of input devices 42 and/or output devices 46. In the example of FIG. 2, UID 4 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 4 presents a user interface.

While illustrated as an internal component of computing device 2, UID 4 also represents and external component that shares a data path with computing device 2 for transmitting and/or receiving input and output. For instance, in one example, UID 4 represents a built-in component of computing device 2 located within and physically connected to the external packaging of computing device 2 (e.g., a screen on a mobile phone). In another example, UID 4 represents an external component of computing device 2 located outside and physically separated from the packaging of computing device 2 (e.g., a monitor, a projector, etc. that shares a wired and/or wireless data path with a tablet computer).

One or more storage devices 48 within computing device 2 may store information for processing during operation of computing device 2 (e.g., computing device 2 may store data accessed by modules 6, 10, and 12 during execution at computing device 2). In some examples, storage device 48 is a temporary memory, meaning that a primary purpose of storage device 48 is not long-term storage. Storage devices 48 on computing device 2 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with modules 6, 8, and 12.

One or more processors 40 may implement functionality and/or execute instructions within computing device 2. For example, processors 40 on computing device 2 may receive and execute instructions stored by storage devices 48 that execute the functionality of UI device module 6, proximate networking module 10, application modules 12, and operating system 54. These instructions executed by processors 40 may cause computing device 2 to store information, within storage devices 48 during program execution. Processors 40 may execute instructions of modules 6, 10, and 12 to cause UI device 4 to perform various actions or functions of computing device 2 as described in this application. That is, modules 6, 8, and 12 may be operable by processors 40 to perform various actions or functions of computing device 2 as described in this application.

Computing device 2 may be part of a mobile communications network. Computing device 2 may exchange data with a server or cloud computing system over the mobile communications network via one or more communication units 8. The server or cloud computing system may perform some or all of the techniques and operations related to modules 6, 10, and 12 described herein. In other words, some or all of the techniques and operations related to modules 6, 10, and 12 can be implemented locally at computing device 2, for instance, a mobile phone, and some or all of the techniques and operations may be performed remotely via a server connected to the mobile communications network that exchanges data with computing device 2. In other words, while shown in FIG. 2 as being included within computing device 2, modules 6, 10, and 12 may be a part of a remote computing system and may execute as one or more remote computing services, such as one or more services provided by a cloud and/or cluster based computing system.

Operating system 54 may execute to cause computing device 2 to perform various functions to manage hardware resources of computing device 2 and to provide various common services for other computer programs. Application modules 12 may execute to cause computing device 2 to provide various applications (e.g., "apps"). In some examples, the various applications provided by application module 12 may transfer various data, such as contact information, images, video files, audio files, and the like, via the techniques for establishing short range wireless peer-to-peer connections disclosed herein.

In some examples, one or more processors 40 may execute proximate networking module 10 to cause computing device 2 to scan for one or more wireless broadcast signals that are each associated with a name that conforms to a specified wireless naming scheme. Computing device 2 may use one or more communication units 8 to perform the scanning for the one or more wireless broadcast signals.

In some other examples, the scanning by one or more communication units 8 may be responsive to UI device 4 operably coupled to computing device 2 transitioning from a powered off state to a powered on state while computing device 2 remains in the powered on state. While computing device 4 is powered on, UI device 4 may sometimes be powered off to conserve power and/or battery life. For example, computing device 2 may turn off or power off UI device 4 after a specified period of user inactivity while computing device 2 remains powered on. In some examples, when UI device 4 is powered off, one or more communication units 8 may not perform the scan for one or more wireless broadcast signals that are each associated with a name that conforms to a specified wireless naming scheme regardless of whether computing device 2 remains powered on. In some other examples, the scanning by one or more communication units 8 may be responsive to UI device 4 operably coupled to computing device 2 transitioning from a powered off state to a powered on state while computing device 2 remains in the powered on state.

In some examples, computing device 2 may scan for multiple wireless broadcast signals of different wireless broadcast protocols that are being broadcast by a single remote computing device, so that computing device 2 may be able to determine the signal strength for multiple wireless broadcast signals being broadcast by the same remote computing device. Therefore, for example, one or more communication units 8 may scan for one or more WiFi signals that conform to a specified naming scheme while also scanning for one or more Bluetooth LE signals that conform to a specified naming scheme. Alternatively, upon computing device 2 identifying a first wireless broadcast signal having the respective name that conforms to the specified wireless naming scheme that is being broadcast by a remote computing device (e.g., a WiFi signal), proximate networking module 10 may then cause proximate one or more communication units 8 to scan for a second wireless broadcast signal being broadcasted by the same remote device that is different from the particular wireless broadcast signal (e.g., a Bluetooth LE signal). The WiFi signal and the Bluetooth LE signal may conform to the same specified naming scheme or separate specified naming schemes.

Responsive to identifying each of the one or more wireless broadcast signals having a respective name that conforms to the specified wireless naming scheme, computing device 2 may determine the signal strength of each of the one or more wireless broadcast signal. For example, if computing device 2 identifies both a WiFi signal and a Bluetooth LE signal that each conforms to the specified naming scheme and that are each broadcast by the same remote device, proximate networking module 10 may determine the signal strength of both the WiFi signal and the Bluetooth LE signal. By receiving multiple signals from the same remote device and determining the signal strength of each of the signals received from the same remote device, proximate networking module 10 may be able to increase its reliability in determining whether the remote device is within the specified proximity of computing device 2.

Computing device 2 may determine a likelihood that a remote device (e.g., one of remote computing devices 14 shown in FIG. 1) broadcasting the particular wireless signal is within a specified proximity of computing device 2, wherein determining the likelihood that the remote device is within the specified proximity of the computing device is based at least in part on (1) a type of the computing device, (2) a type of the remote device broadcasting the particular wireless broadcast signal, and (3) the signal strength of the particular wireless broadcast signal. Proximate networking module 10 may determine the signal strength of each of the one or more wireless broadcast signals received by computing device 2 from the remote device, and may normalize the determined signal strength of each of the one or more wireless broadcast signals. Proximate networking module 10 may compare the normalized signal strength of each of the one or more wireless broadcast signals against a threshold signal strength, such that if a normalized signal strength exceeds the threshold signal strength then the normalized signal strength may indicate that the remote device is within the specified proximity of computing device 2. In some examples, proximate networking module may determine that the likelihood that the remote device is within the specified proximity of computing device 2 exceeds a specified threshold if each of the normalized signal strengths exceeds the threshold signal strength. In other examples, proximate networking module may determine that the likelihood that the remote device is within the specified proximity of computing device 2 exceeds a specified threshold if proximate networking module 10 determines that at least one of the normalized signal strengths exceeds the threshold signal strength.

Responsive to determining that the likelihood that the remote device is within the specified proximity of computing device 2 exceeds a specified threshold, computing device 2 may establish a wireless connection with the remote device. For example, proximate networking module 10 may cause one or more communication units 8 to establish a wireless networking connection with the remote device via a wireless networking protocol, such as WiFi, Bluetooth, Bluetooth LE, and the like. In some examples, computing device 2 and/or the remote device may perform one or more actions to confirm the identity of computing device 2 and the remote device. For example, computing device 2 may wirelessly broadcast a signal that is received by the remote device, and the remote device may likewise determine the signal strength of the signal, normalize the signal strength, and confirm that computing device 2 is within a specified proximity of the remote device based on the normalized signal strength. In this way, computing device 2 and the remote device may each confirm that the other device is within the specified proximity. In some examples, computing device 2 and remote device 2 may establish a secure wireless connection, such as via certificate chains, zero knowledge proofs, shared secrets, one-time passwords, and the like.

Figure 3:
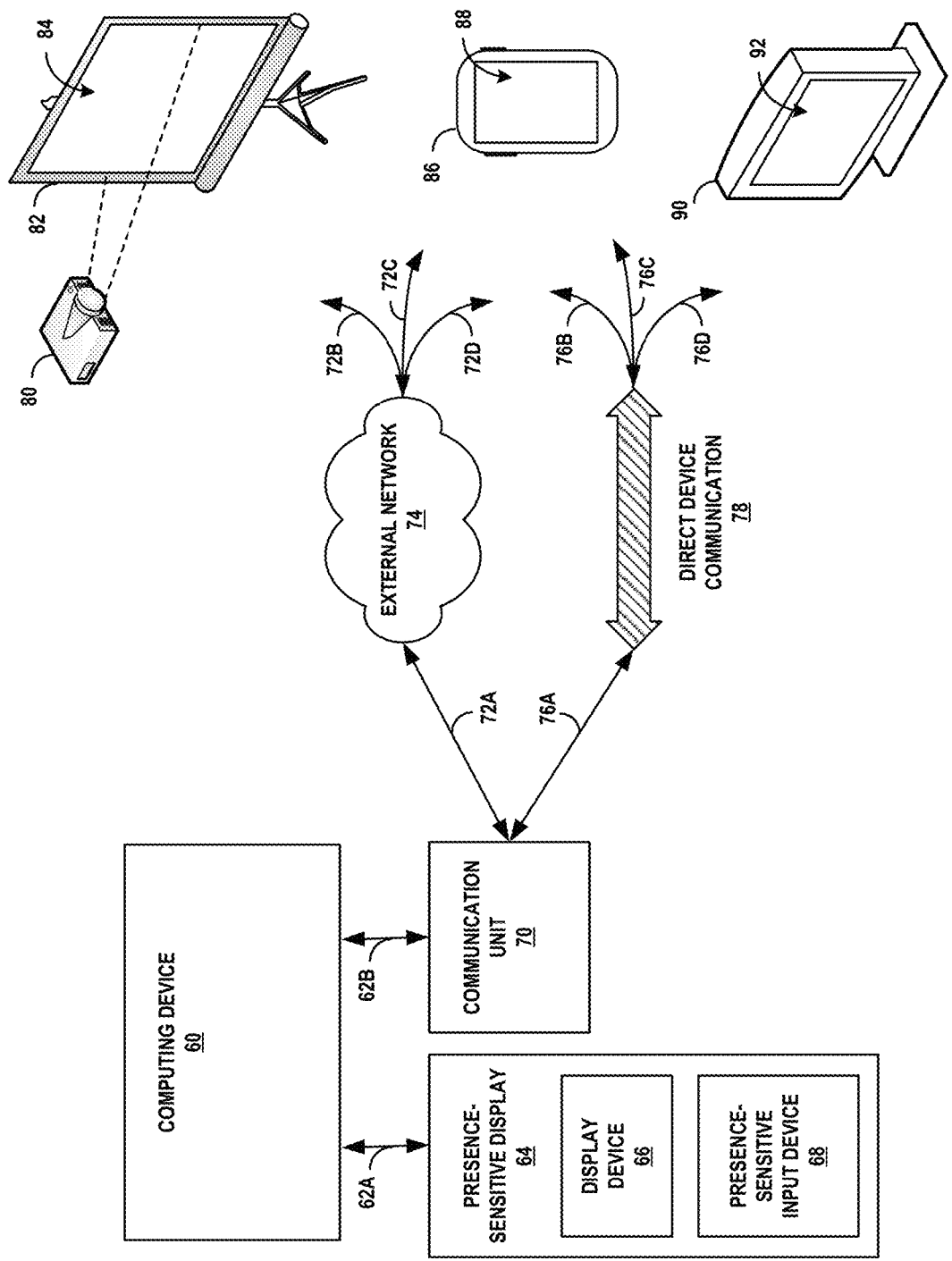
FIG. 3 is a block diagram illustrating an example computing device that outputs graphical content for display at an example remote device in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 60, presence-sensitive display 64, communication unit 70, projector 80, projector screen 82, mobile device 86, and visual display device 90. Although shown for purposes of example in FIGS. 1 and 2 as a stand-alone computing device 2, a computing device such as computing device 60 may, generally, be any component or system that includes a processor or other suitable computing environment for executing software instructions and, for example, need not include a presence-sensitive display.

As shown in the example of FIG. 3, computing device 60 may be a processor that includes functionality as described with respect to processor 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 3, computing device 60 may be operatively coupled to presence-sensitive display 64 and communication unit 70 by any number of one or more communication channels.

In other examples, such as illustrated previously by computing device 2 in FIGS. 1-2, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 64 may include display device 66 and presence-sensitive input device 68. Display device 66 may, for example, receive data from computing device 60 and display the graphical content. In some examples, presence-sensitive input device 68 may determine one or more inputs (e.g., continuous gestures, multi-touch gestures, single-touch gestures, etc.) at presence-sensitive display 64 using capacitive, inductive, and/or optical recognition techniques and send indications of such input to computing device 60 using communication channel 62A. In some examples, presence-sensitive input device 68 may be physically positioned on top of display device 66 such that, when a user positions an input unit over a graphical element displayed by display device 66, the location at which presence-sensitive input device 68 corresponds to the location of display device 66 at which the graphical element is displayed. In other examples, presence-sensitive input device 68 may be positioned physically apart from display device 66, and locations of presence-sensitive input device 68 may correspond to locations of display device 66, such that input can be made at presence-sensitive input device 68 for interacting with graphical elements displayed at corresponding locations of display device 66.

As shown in FIG. 3, computing device 60 may also include and/or be operatively coupled with communication unit 70. Communication unit 70 may include functionality of one or more communication units 8 as described in FIGS. 1 and 2. Examples of communication unit 70 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 60 may also include and/or be operatively coupled with one or more other devices, e.g., input devices, output devices, memory, storage devices, etc. that are not shown in FIG. 3 for purposes of brevity and illustration.

FIG. 3 also illustrates a projector 80 and projector screen 82. Other such examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more inputs (e.g., continuous gestures, multi-touch gestures, single-touch gestures, etc.) at projector screen 82 using optical recognition or other suitable techniques and send indications of such input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of UI device 4 as described in this disclosure. In some examples, presence-sensitive display 84 may include additional functionality. Projector screen 82 (e.g., an electronic display of computing eye glasses) may receive data from computing device 60 and display the graphical content. In some examples, presence-sensitive display 84 may determine one or more inputs (e.g., continuous gestures, multi-touch gestures, single-touch gestures, etc.) at projector screen 82 using capacitive, inductive, and/or optical recognition techniques and send indications of such input using one or more communication units to computing device 60.

FIG. 3 also illustrates mobile device 86 and visual display device 90 Mobile device 86 and visual display device 90 may each include computing and connectivity capabilities. Examples of mobile device 86 may include e-reader devices, convertible notebook devices, hybrid slate devices, computerized watches, computerized eyeglasses, etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive displays 88 and 92 may include a subset of functionality or all of the functionality of UID 4 as described in this disclosure. In some examples, presence-sensitive displays 88 and 92 may include additional functionality. In any case, presence-sensitive display 92, for example, may receive data from computing device 60 and display the graphical content. In some examples, presence-sensitive display 92 may determine one or more inputs (e.g., continuous gestures, multi-touch gestures, single-touch gestures, etc.) at projector screen using capacitive, inductive, and/or optical recognition techniques and send indications of such input using one or more communication units to computing device 60.

As described above, in some examples, computing device 60 may output graphical content for display at presence-sensitive display 64 that is coupled to computing device 60 by a system bus or other suitable communication channel. Computing device 60 may also output graphical content for display at one or more remote devices, such as projector 80, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a presence-sensitive display that is included in and/or operatively coupled to the respective remote devices.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to network external network 74 by one of respective network links 72B, 72C, and 72D. External network 74 may include network hubs, network switches, network routers, etc., that are operatively inter-coupled thereby providing for the exchange of information between computing device 60 and the remote devices illustrated in FIG. 3. In some examples, network links 72A-722D may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include one or more of Bluetooth, Near-Field Communication, Universal Serial Bus, Wi-Fi, infrared, etc. One or more of the remote devices illustrated in FIG. 3 may be operatively coupled with computing device 60 by communication links 76A-76D. In some examples, communication links 76A-76D may be connections using Bluetooth, Near-Field Communication, Universal Serial Bus, infrared, etc. Such connections may be wireless and/or wired connections.

In the example of FIG. 3, computing device 60 may output a GUI for display by a display device (e.g., display device 66, presence-sensitive displays 84, 88, 92, etc.). For instance, computing device 60 may send data representing the GUI to communication unit 70. Communication unit 70 may send the data to visual display device 90 via external network 74. Visual display device 90 may cause presence-sensitive display 92 to output the GUI.

In accordance with aspects of the present disclosure, computing device 60 may scan for one or more wireless broadcast signals that are each associated with a name that conforms to a specified wireless naming scheme. Responsive to identifying a particular wireless broadcast signal having a respective name that conforms to the specified wireless naming scheme, computing device 60 may determine a signal strength of the particular wireless broadcast signal. Computing device 60 may determine a likelihood that a remote device broadcasting the particular wireless signal is within a specified proximity of computing device 60, wherein determining the likelihood that the remote device is within the specified proximity of computing device 60 is based at least in part on (1) a type of computing device 60, (2) a type of the remote device broadcasting the particular wireless broadcast signal, and (3) the signal strength of the particular wireless broadcast signal. Responsive to determining that the likelihood that the remote device is within the specified proximity of computing device 60 exceeds a specified threshold, computing device 60 may establish a wireless connection with the remote device.

Figure 4A:
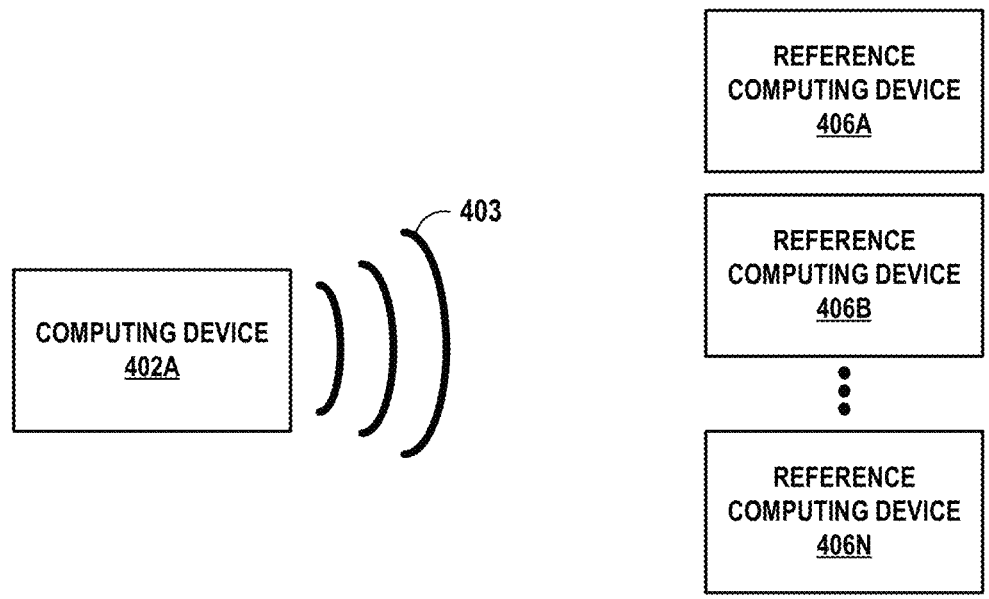
FIGS. 4A-4B are block diagrams illustrating example techniques for normalizing the signal strength of signals that are wirelessly broadcast by computing devices in accordance with one or more techniques of the present disclosure.
Figure 4B:
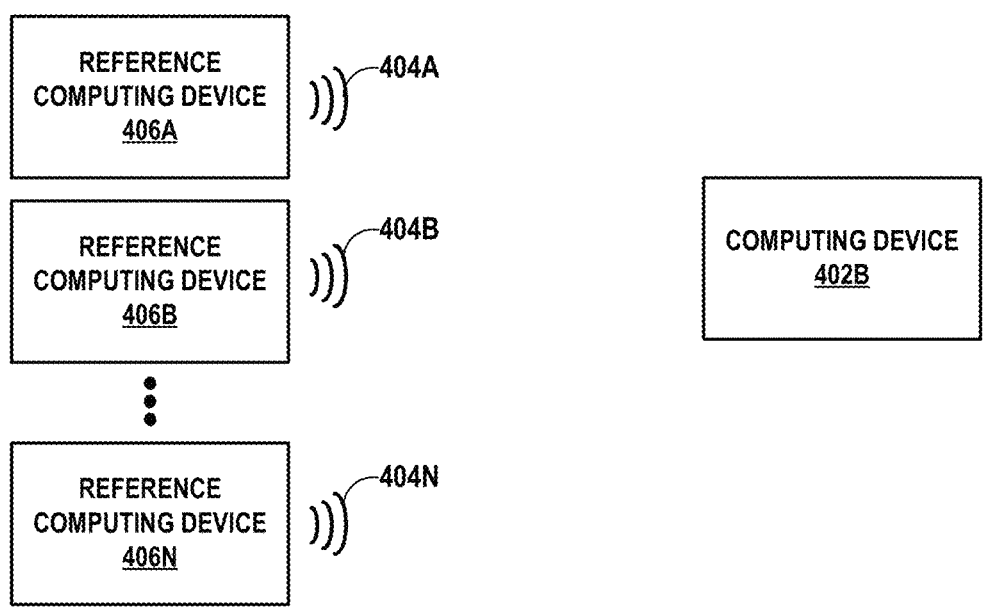

FIGS. 4A-4B are block diagrams illustrating example techniques for normalizing the signal strength of signals that are wirelessly broadcast by computing devices in accordance with one or more techniques of the present disclosure. For example, given a transmitting computing device that wirelessly transmits a signal that is received by a receiving computing device, the receiving computing device may determine a signal strength of the received signal and may normalize the signal strength. The receiving computing device may, based on the normalized signal strength, determine whether the transmitting computing device is nearby (e.g., within a specified distance of the receiving computing device). Normalizing the signal strength of signals may enable signal strengths of signals that are wirelessly transmitted and received by disparate devices to be compared, such that normalized signal strengths may correlate to distances between respective transmitting and receiving computing devices regardless of the device types of the respective transmitting and receiving computing devices.

As shown in FIGS. 4A and 4B, for a particular pair of computing devices, such as computing device 402A that wirelessly broadcasts a signal that is received by computing device 402B, a normalizing function for normalizing the signal strength of the signal broadcast by computing device 402A and received by computing device 402B may be determined. Computing device 402B may employ the determined normalizing function to normalize the signal strength of the signal broadcast by computing device 402A and received by computing device 402B, and may determine whether the likelihood that computing device 402A is within the specified proximity of computing device 402B exceeds a specified threshold based on the normalized signal strength.

The normalizing function may be specific to a specific pair of a transmitting device of a specified device type and a receiving device of a specified device type. As such, the normalizing function to normalize the signal strength of the signal broadcast by computing device 402A and received by computing device 402B may be specific to the signal strength of a signal that is wirelessly transmitted by a computing device of the same device type as computing device 402A and that is received by a computing device of the same device type as computing device 402B. Thus, the normalizing function for normalizing the signal strength of the signal broadcast by computing device 402A and received by computing device 402B is different from the normalizing function for normalizing, for example, a signal strength of a signal broadcast by computing device 402B and received by computing device 402A.

Such a normalizing function for normalizing the signal strength of the signal broadcast by computing device 402A and received by computing device 402B may be determined by testing computing devices 402A and 402B against a set of reference computing devices 406A-406N ("reference computing devices 406"), such as via manual, semi-automated, or automated testing. For example, testers (e.g., human testers) may utilize a combination of any of robotic apparatuses, measurement tools, computing devices, and the like to test computing devices of varying device types, including computing device 402A and computing device 402B, against reference computing devices 406. By testing computing devices against a set of reference computing devices, such as reference computing devices 406, computing device 402A (or a computing device of the same device type of computing device 402A) does not necessarily have to be directly tested against computing device 402B (or a computing device of the same device type as computing device 402B) in order to determine a normalizing function for normalizing the signal strength of a signal wirelessly broadcasted by computing device 402A and received by computing device 402B.

As shown in FIG. 4A, computing device 402A's wireless broadcasting capabilities may be tested by computing device 402A wirelessly broadcasting signal 403 that is received by reference computing devices 406. Each of reference computing devices 406 may determine a signal strength of signal 403 received by respective reference computing devices 406 located within the specified threshold from computing device 402A. The values of the signal strengths determined by reference computing devices 406 may be used to normalize the signal strength transmitted by computing device 402A.

In the example of FIG. 4A, each of reference computing devices 406 may be located within a specified threshold from computing device 402A, such that each individual reference computing device of reference computing devices 406 is the same distance from computing device 402A. For example, if the specified threshold of whether two computing devices are deemed to be physically proximate to each other is less than or equal to four inches, then each of reference computing devices 406 may be located four inches from computing device 402A. In other examples, each of reference computing devices 406 may be located at less than the specified threshold (e.g., less than four inches) from computing device 402A. Further, reference computing devices 406 may be a set of different types of computing devices (e.g., different models of computing devices, different brands of computing devices, different configurations of computing devices, and the like).

As shown in FIG. 4B, computing device 402B's capability to receive wireless broadcast signals may also be tested by each of reference devices 406 wirelessly broadcasting respective signals 404A-404N ("signals 404") that are received by computing device 402B. Computing device 402B may receive each of signals 404 and may determine a signal strength for each of signals 404 received by computing device 402B.

In the example of FIG. 4B, each of reference computing devices 406 may be located within a specified threshold from computing device 402B, such that each individual reference computing device of reference computing devices 406 is the same distance from computing device 402B. For example, if the specified threshold of whether two computing devices are deemed to be physically proximate to each other is less than or equal to four inches, then each of reference computing devices 406 may be located four inches from computing device 402B. In other examples, each of reference computing devices 406 may be located at less than the specified threshold (e.g., less than four inches) from computing device 402B. Further, reference computing devices 406 may be a set of different types of computing devices (e.g., different models of computing devices, different brands of computing devices, different configurations of computing devices, and the like).

Based on the results of testing computing device 402A's wireless broadcasting capabilities and computing device 402B's capability to receive wireless broadcast signals, a normalizing function for normalizing the signal strength of the signal broadcast by computing device 402A and received by computing device 402B may be expressed in the following equation:

$$\text{normalized\_rssi}(rssi, transmitter, scanner) = f(rssi, transmit\_rssi\_A, transmit\_rssi\_B, \ldots, transmit\_rssi\_N, scan\_rssi\_A, scan\_rssi\_B, scan\_rssi\_N) \quad (4)$$

where rssi is the signal strength determined by computing device 402B of the signal wirelessly broadcast by computing device 402A and received by computing device 402B, transmitter is computing device 402A, scanner is computing device 402B, transmit_rssi_A to transmit_rssi_B are the signal strengths determined by each of reference computing devices 406 of signal 403, and scan_rssi_A to scan_rssi_N are the signal strengths determined by computing device 402B of signals 404.

As shown in equation (4), the normalizing equation normalized_rssi(rssi, transmitter, scanner) for normalizing the signal strength of the signal broadcast by computing device 402A and received by computing device 402B may be generated based on the signal strength of signal 403 wirelessly broadcast by computing device 402A as determined by each of reference computing devices 406 (i.e., transmit_rssi_A to transmit_rssi_N), as well as the signal strengths of signals 404 wirelessly broadcast by reference computing devices 406 as determined by computing device 402B (i.e., scan_rssi_A to scan_rssi_N). The generated normalizing equation may, in some examples, be the one or more normalizing functions (e.g., normalizing functions fw( ), fd( ), gw( ), and/or gb( ) in equation (1), equation (2), and/or equation (3).

Figure 5:
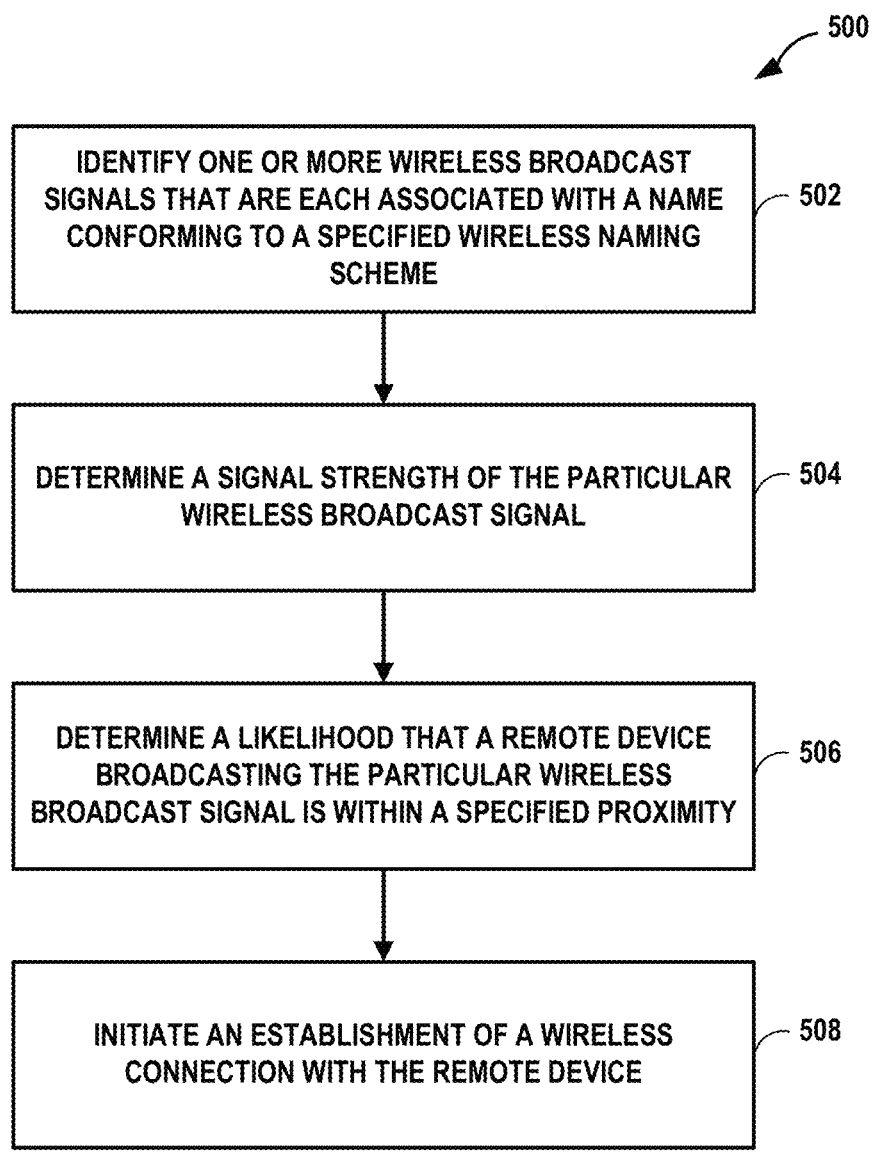
FIG. 5 is a flow chart illustrating an example process for establishing a wireless connection between proximate computing devices.

FIG. 5 is a flow chart illustrating an example process 500 for establishing a wireless connection between proximate computing devices. The example process 500 is illustrated with respect to FIGS. 1 and 2. As shown in FIG. 5, computing device 2 may identify one or more wireless broadcast signals that are each associated with a name that conforms to a specified wireless naming scheme (502). Responsive to identifying a particular wireless broadcast signal that is associated with a respective name conforming to the specified wireless naming scheme, computing device 2 may determine a signal strength of the particular wireless broadcast signal (504). Computing device 2 may determine a likelihood that a remote device broadcasting the particular wireless signal is within a specified proximity of computing device 2, wherein determining the likelihood that the remote device is within the specified proximity of computing device 2 is based at least in part on (1) a type of computing device 2, (2) a type of the remote device broadcasting the particular wireless broadcast signal, and (3) the signal strength of the particular wireless broadcast signal (506). Responsive to determining that the likelihood that the remote device is within the specified proximity of computing device 2 exceeds a specified threshold, computing device 2 may initiate an establishment of a wireless connection with the remote device (508).

In some examples, responsive to identifying the particular wireless broadcast signal that is associated with the respective name conforming to the specified wireless naming scheme, computing device 2 may identify a second wireless broadcast signal being broadcasted by the remote device, the second wireless broadcast signal being different from the particular wireless broadcast signal and, responsive to identifying the second wireless broadcast signal, computing device 2 may determine second signal strength of the second wireless broadcast signal. In some examples, determining the likelihood that the remote device is within the specified proximity of computing device 2 is further based at least in part on the second signal strength of the second wireless broadcast signal. In some examples, the particular wireless broadcast signal may comprise a WiFi signal and the second wireless broadcast signal may comprise a Bluetooth signal.

In some examples, each of the one or more wireless broadcast signals does not comprise a Near Field Communications (NFC) signal. In some examples, determining, by computing device 2, the likelihood that the remote device broadcasting the particular wireless signal is within the specified proximity of the computing device further comprises determining a normalized signal strength based at least in part on (1) the type of the computing device, (2) the type of the remote device broadcasting the particular wireless broadcast signal, and (3) the signal strength of the particular wireless broadcast signal and determining, by computing device 2, whether the normalized signal strength exceeds a threshold value. In some examples, determining the normalized signal strength is based at least in part on a normalizing function that is specific to the type of the computing device and the type of the remote device broadcasting the particular wireless broadcast signal.

In some examples, identifying, by computing device 2, of the one or more wireless broadcast signals that are each associated with the name that conforms to the specified wireless naming scheme is responsive to a display device operably coupled to computing device 2 transitioning from a powered off state to a powered on state while computing device 2 remains in the powered on state. In some examples, scanning, by computing device 2, for the one or more wireless broadcast signals that are each associated with the name that conforms to the specified wireless naming scheme is responsive to scanning, by computing device 2, for a second one or more wireless broadcast signals of a same wireless protocol as the one or more wireless broadcast signals. In some examples, determining, by computing device 2, the signal strength of the particular wireless broadcast signal may further include periodically updating a determination of the signal strength of the particular wireless signal. In some example, computing device 2 may confirm an identity of the remote device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method comprising:
identifying, by a computing device, one or more wireless broadcast signals that are each associated with a name that conforms to a specified wireless naming scheme;
responsive to identifying a particular wireless broadcast signal broadcasted by a remote device that is associated with a respective name conforming to the specified wireless naming scheme, identifying, by the computing device, a second wireless broadcast signal being broadcasted by the remote device, the second wireless broadcast signal being different from the particular wireless broadcast signal;
determining, by the computing device, a signal strength of the second wireless broadcast signal;
determining, by the computing device, a likelihood that the remote device is within a specified proximity of the computing device, wherein determining the likelihood that the remote device is within the specified proximity of the computing device is based at least in part on (1) a type of the computing device, (2) a type of the remote device broadcasting the second wireless broadcast signal, and (3) the signal strength of the second wireless broadcast signal; and
responsive to determining that the likelihood that the remote device is within the specified proximity of the computing device exceeds a specified threshold, initiating, by the computing device, an establishment of a wireless connection with the remote device.

2. The method of claim 1, wherein the particular wireless broadcast signal comprises a WiFi signal and the second wireless broadcast signal comprises a Bluetooth signal.

3. The method of claim 1, wherein each of the one or more wireless broadcast signals does not comprise a Near Field Communications (NFC) signal.

4. The method of claim 1, wherein determining, by the computing device, the likelihood that the remote device is within the specified proximity of the computing device further comprises:
  determining, by the computing device, a normalized signal strength based at least in part on (1) the type of the computing device, (2) the type of the remote device, and (3) the signal strength of the second wireless broadcast signal; and
  determining, by the computing device, whether the normalized signal strength exceeds a threshold value.

5. The method of claim 4, wherein determining the normalized signal strength is based at least in part on a normalizing function that is specific to the type of the computing device and the type of the remote device.

6. The method of claim 1, wherein the identifying, by the computing device, the one or more wireless broadcast signals that are each associated with the name that conforms to the specified wireless naming scheme is responsive to a display device operably coupled to the computing device transitioning from a powered off state to a powered on state while the computing device remains in the powered on state.

7. The method of claim 1 wherein determining, by the computing device, the signal strength of the second wireless broadcast signal further comprises:
  periodically updating a determination of the signal strength of the second wireless broadcast signal.

8. The method of claim 1, further comprising:
  confirming, by the computing device, an identity of the remote device.

9. A computing device comprising:
  at least one processor; and
  at least one module operable by the at least one processor to:
    identify one or more wireless broadcast signals that are each associated with a name that conforms to a specified wireless naming scheme;
    responsive to identifying a particular wireless broadcast signal broadcast by a remote device that is associated with a respective name conforming to the specified wireless naming scheme, identify a second wireless broadcast signal being broadcasted by the remote device, the second wireless broadcast signal being different from the particular wireless broadcast signal;
    determine a signal strength of the second wireless broadcast signal;
    determine a likelihood that a remote device is within a specified proximity of the computing device, wherein determining the likelihood that the remote device is within the specified proximity of the computing device is based at least in part on (1) a type of the computing device, (2) a type of the remote device broadcasting the second wireless broadcast signal, and (3) the signal strength of the second wireless broadcast signal; and
    responsive to determining that the likelihood that the remote device is within the specified proximity of the computing device exceeds a specified threshold, initiate an establishment of a wireless connection with the remote device.

10. The computing device of claim 9, wherein the particular wireless broadcast signal comprises a WiFi signal and the second wireless broadcast signal comprises a Bluetooth signal.

11. The computing device of claim 9, wherein each of the one or more wireless broadcast signals does not comprise a Near Field Communications (NFC) signal.

12. The computing device of claim 9, wherein the at least one module operable by the at least one processor to determine the likelihood that the remote device is within the specified proximity of the computing device is further operable by the at least one processor to:
  determine a normalized signal strength based at least in part on (1) the type of the computing device, (2) the type of the remote device, and (3) the signal strength of the second wireless broadcast signal; and
    determine whether the normalized signal strength exceeds a threshold value.

13. The computing device of claim 12, wherein determining the normalized signal strength is based at least in part on a normalizing function that is specific to the type of the computing device and the type of the remote device.

14. The computing device of claim 9, wherein the identifying the one or more wireless broadcast signals that are each associated with the name that conforms to the specified wireless naming scheme is responsive to a display device operably coupled to the computing device transitioning from a powered off state to a powered on state while the computing device remains in the powered on state.

15. A non-transitory computer-readable storage medium encoded with instructions that, when executed, cause at least one processor of a computing device to:
  identify one or more wireless broadcast signals that are each associated with a name that conforms to a specified wireless naming scheme;
  responsive to identifying a particular wireless broadcast signal broadcasted by a remote device that is associated with a respective name conforming to the specified wireless naming scheme, identify a second wireless broadcast signal being broadcasted by the remote device, the second wireless broadcast signal being different from the particular wireless broadcast signal;
  determine a signal strength of the second wireless broadcast signal;
  determine a likelihood that a remote device is within a specified proximity of the computing device, wherein determining the likelihood that the remote device is within the specified proximity of the computing device is based at least in part on (1) a type of the computing device, (2) a type of the remote device broadcasting the second wireless broadcast signal, and (3) the signal strength of the second wireless broadcast signal; and
  responsive to determining that the likelihood that the remote device is within the specified proximity of the computing device exceeds a specified threshold, initiate an establishment of a wireless connection with the remote device.

16. The non-transitory computer-readable storage medium of claim 15, wherein the particular wireless broadcast signal comprises a WiFi signal and the second wireless broadcast signal comprises a Bluetooth signal.

17. The non-transitory computer-readable storage medium of claim 15, wherein each of the one or more wireless broadcast signals does not comprise a Near Field Communications (NFC) signal.

18. The non-transitory computer-readable storage medium of claim 15, wherein the instructions, when executed, that cause the at least one processor of the computing device to determine the likelihood that the remote device is within the specified proximity of the computing device further cause the at least one processor of the computing device to:

determine a normalized signal strength based at least in part on (1) the type of the computing device, (2) the type of the remote device broadcasting the second wireless broadcast signal, and (3) the signal strength of the second wireless broadcast signal; and determine whether the normalized signal strength exceeds a threshold value.

19. The non-transitory computer-readable storage medium of claim 18, wherein determining the normalized signal strength is based at least in part on a normalizing function that is specific to the type of the computing device and the type of the remote device.

20. The non-transitory computer-readable storage medium of claim 15, wherein each of the one or more wireless broadcast signals does not comprise a Near Field Communications (NFC) signal.

\* \* \* \* \*